(12) United States Patent
Babon et al.

(10) Patent No.: US 11,257,236 B2
(45) Date of Patent: Feb. 22, 2022

(54) METHOD FOR ESTIMATING A DEPTH FOR PIXELS, CORRESPONDING DEVICE AND COMPUTER PROGRAM PRODUCT

(71) Applicant: InterDigital CE Patent Holdings, SAS, Paris (FR)

(72) Inventors: Frederic Babon, Chateaubourg (FR); Neus Sabater, Betton (FR); Matthieu Hog, Cesson-Sevigne (FR); Didier Doyen, La Bouexiere (FR); Guillaume Boisson, Pleumeleuc (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 17/261,375

(22) PCT Filed: Jul. 17, 2019

(86) PCT No.: PCT/EP2019/069246
§ 371 (c)(1),
(2) Date: Jan. 19, 2021

(87) PCT Pub. No.: WO2020/016299
PCT Pub. Date: Jan. 23, 2020

(65) Prior Publication Data
US 2021/0279902 A1 Sep. 9, 2021

(30) Foreign Application Priority Data
Jul. 19, 2018 (EP) ..................................... 18305989

(51) Int. Cl.
*G06T 7/557* (2017.01)

(52) U.S. Cl.
CPC .... *G06T 7/557* (2017.01); *G06T 2207/10052* (2013.01)

(58) Field of Classification Search
None
See application file for complete search history.

(56) References Cited

U.S. PATENT DOCUMENTS 8,619,082 B1 * 12/2013 Ciurea ...................... G06T 7/85
345/427
9,858,673 B2 * 1/2018 Ciurea .................... G06T 7/557
(Continued)

FOREIGN PATENT DOCUMENTS

WO   WO 2016173631 A1   11/2016

OTHER PUBLICATIONS

Zhu et al., "Occlusion-Model Guided Anti-Occlusion Depth Estimation in Light Field", IEEE Journal of Selected Topics in signal Processing, vol. 11, No. 7, Oct. 2017, 14 pages.
(Continued)

*Primary Examiner* — Anand P Bhatnagar
(74) *Attorney, Agent, or Firm* — Condo Roccia Koptiw LLP

(57) ABSTRACT

A method is proposed for estimating a depth for pixels in a matrix of M images. Such method comprises, at least for one set of N images among the M images, 2<N≤M, a process comprising: —determining depth maps for the images in the set of N images delivering a set of N depth maps; —for at least one current pixel for which a depth has not yet been estimated: —deciding if a candidate depth corresponding to a depth value in the set of N depth maps is consistent or not with the other depth map(s) of the set of N depth maps; —selecting the candidate depth as being the estimated depth for the current pixel if the candidate depth is decided as consistent. The process is enforced iteratively with a new N value which is lower than the previous N value used in the previous iteration of the process.

20 Claims, 4 Drawing Sheets

(56) References Cited

U.S. PATENT DOCUMENTS

| | | | |
|---|---|---|---|
| 10,424,060 B2* | 9/2019 | Satish | A61B 5/14551 |
| 10,832,429 B2* | 11/2020 | Blasco Claret | G06T 5/002 |
| 10,911,735 B2* | 2/2021 | Hamilton | H04N 13/302 |
| 11,176,663 B2* | 11/2021 | Satish | A61B 5/02042 |
| 2003/0189731 A1* | 10/2003 | Chang | G06K 9/00 |
| | | | 358/3.28 |
| 2019/0236796 A1* | 8/2019 | Blasco Claret | G06T 7/155 |
| 2020/0051266 A1* | 2/2020 | Blasco Claret | G06T 7/593 |
| 2020/0273188 A1* | 8/2020 | Hamilton | H04N 19/187 |
| 2021/0357622 A1* | 11/2021 | Keinert | G06K 9/00214 |
| 2021/0358163 A1* | 11/2021 | Keinert | G06T 7/50 |

OTHER PUBLICATIONS

Wolff et al., "Point Cloud Noise and Outlier Removal for Image-Based 3D Reconstruction", 2016 Fourth International Conference on 3D Vision (3DV), Stanford, California, United States, Oct. 25, 2016, 10 pages.

Zhu et al., "An Efficient Anti-Occlusion Depth Estimation using Generalized EPI Representation in Light Field", Optoelectronic Imaging and Multimedia Technology IV, Proceedings of the SPIE, vol. 10020, 1002008, Oct. 31, 2016, 9 pages.

Qin et al., "Enhanced Depth Estimation for Hand-Held Light Field Cameras", 2017 IEEE International Conference on Acoustics, Speech and Signal Processing (ICASSP), New Orleans, Louisiana, United States, Mar. 5, 2017, pp. 2032-2036.

Wang et al., "Occlusion-Aware Depth Estimation Using Light-Field Cameras", 2015 IEEE International Conference on Computer Vision (ICCV), Santiago, Chile, Dec. 7, 2015, pp. 3487-3495.

Hu et al., "A Quantitative Evaluation of Confidence Measures for Stereo Vision", IEEE Transactions on Pattern Analysis and Machine Intelligence, vol. 34, No. 11, Nov. 2012, 14 pages.

Navarro et al., "Robust and Dense Depth Estimation for Light Field Images", IEEE Transactions on Image Processing, vol. 26, No. 4, Apr. 2017, pp. 1873-1886.

Wei et al., "Multi-View Depth Map Estimation With Cross-View Consistency", Proceedings of the British Machine Vision Conference. BMVA Press, Sep. 2014, 13 pages.

Wang et al., "Depth Estimation with Occlusion Modeling using Light-Field Cameras", IEEE Transactions on Pattern Analysis and Machine Intelligence, vol. 38, No. 11, Nov. 2016, pp. 2170-2181.

Hou et al., "Occlusion Robust Light Field Depth Estimation Using Segmentation Guided Bilateral Filtering", 2017 IEEE International Symposium on Multimedia (ISM), Taichung, Taiwan, Dec. 11, 2017, pp. 14-18.

* cited by examiner

METHOD FOR ESTIMATING A DEPTH FOR PIXELS, CORRESPONDING DEVICE AND COMPUTER PROGRAM PRODUCT

This application claims the benefit, under 35 U.S.C. § 365 of International Application PCT/EP2019/069246, filed Jul. 17, 2019, which was published in accordance with PCT Article 21(2) on Jan. 23, 2020, in English, and which claims the benefit of European Patent Application No. 18305989.8, filed Jul. 19, 2018.

FIELD OF THE DISCLOSURE

The present disclosure relates generally to the field of Light Field (LF) content (e.g. LF image or video).

More specifically, the disclosure relates to a method for estimating the depth of pixels belonging to images in a LF content.

The disclosure can be of interest in any field where LF capture is used, both for professional and consumers.

TECHNOLOGICAL BACKGROUND

LF contents consist either in:
- plenoptic video, also known as lenslet based video, i.e. in a video in which the images belonging to a matrix of images are sub-aperture images that have been captured simultaneously from a single camera using a micro-lens array in addition to the main lenses system, as for instance a plenoptic camera; or
- multi-view video, i.e. in a video in which the images belonging to a matrix of images have been captured simultaneously from multiple camera angles, typically using a camera array (also known as camera rig) comprising several cameras.

Estimation of depth for pixels in LF contents most of the time reduce to the duplication to each view belonging to the LF content of known technics (e.g. matching technics) classically used for determining such depth, based on the availability of at least two views capturing the same scene from two different points of view.

However, approaches based on the use of two different views fail to give reliable results e.g. in particular cases where an occlusion occurs. Indeed, in that case a part of the scene captured by a given view may have been not captured by the other view. In that case no depth can be determined, or an aberrant value is returned by such known algorithms.

Some proposals have been made for using the largest number of points of view available in a LF content in order to get more reliable results in depth estimation e.g. when occlusion occurs like in the paper by H. Zhu, Q. Wang and J. Yu, "*Occlusion-Model Guided Anti-Occlusion Depth Estimation in Light Field*," in IEEE Journal of Selected Topics in Signal Processing, vol. 11, no. 7, pp. 965-978, October 2017. However, such approach can still be improved.

Consequently, there is a need for a method that takes advantage of the information related to the different views in a LF content for estimating the depth of pixels with an enforced consistency, in particular in presence of occlusions.

There is also a need for having such method that allows a high quality in the estimated depth.

SUMMARY

The present disclosure relates to a method for estimating a depth for pixels in a matrix of M images of a light field content, with M>2. Such method comprises, at least for one set of N images taken among the M images, 2<N≤M, a process comprising:
- determining depth maps for the images in the set of N images delivering a set of N depth maps; and
- for at least one current pixel in a current image of the set of N images:
  - deciding if a candidate depth corresponding to a depth value associated with the current pixel in a depth map of the set of N depth maps is consistent or not with the other depth map(s) of the set of N depth maps; and
  - selecting the candidate depth as being the estimated depth for the current pixel, if the candidate depth is decided as consistent with the other depth map(s) of the set of N depth maps.

The process is enforced iteratively, each new iteration of the process being carried out with a new N value which is lower than the previous N value used in the previous iteration of the process.

Another aspect of the disclosure pertains to a device for estimating a depth for pixels in a matrix of M images of a light field content, with M>2. Such device comprises a processor or a dedicated computing machine configured for, at least for one set of N images taken among the M images, 2<N≤M, enforcing a process comprising:
- determining depth maps for the images in the set of N images delivering a set of N depth maps; and
- for at least one current pixel in a current image of the set of N images:
  - deciding if a candidate depth corresponding to a depth value associated with the current pixel in a depth map of the set of N depth maps is consistent or not with the other depth map(s) of the set of N depth maps; and
  - selecting the candidate depth as being the estimated depth for the current pixel, if the candidate depth is decided as consistent with the other depth map(s) of the set of N depth maps.

The process is enforced iteratively, each new iteration of the process being carried out with a new N value which is lower than the previous N value used in the previous iteration of the process.

In addition, the present disclosure concerns a non-transitory computer readable medium comprising a computer program product recorded thereon and capable of being run by a processor, including program code instructions comprising program code instructions for implementing a method for estimating a depth for pixels in a matrix of M images of a light field content previously described.

LIST OF FIGURES

Other features and advantages of embodiments shall appear from the following description, given by way of indicative and non-exhaustive examples and from the appended drawings, of which:

FIG. 1 illustrates a matrix of images of a LF content according to one embodiment;

FIGS. 2a and 2b each illustrate a plurality of sets of images (or angular patches) according to one embodiment;

FIGS. 3a and 3b each illustrate a plurality of spatial patches of pixels according to one embodiment;

DETAILED DESCRIPTION

In all of the figures of the present document, the same numerical reference signs designate similar elements and steps.

Figure 1:
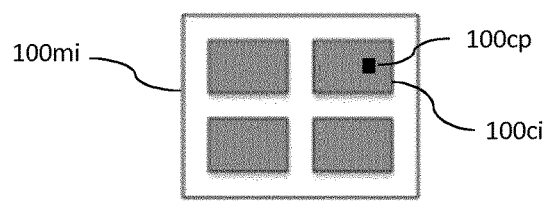

We now describe in relationship with FIG. 1 a matrix of images 100mi of a LF content according to one embodiment.

The matrix of images 100mi comprises four images captured simultaneously, i.e. at a given instant, by a LF capturing system. In other embodiments, the matrix of images comprises any number of images greater than two that have been captured simultaneously by a LF capturing system.

Back to FIG. 1, each image of the matrix of images 100mi corresponds to a different view of a same scene. In that sense, there is an equivalence between the images and the corresponding views. For example, such LF capturing system is a camera array (or camera rig) and each image is taken by a different camera of the camera array. In other examples, the LF capturing system is a plenoptic camera and the images belonging to the matrix of images are sub-aperture images.

Among the images belonging to the matrix of images 100mi, there is a current image 100ci and a current pixel 100cp belonging to the current image 100ci. In the sequel, we assume that a depth has not yet been estimated for the current pixel 100cp so that the current pixel 100cp is taken as an example for detailing the steps of the method for estimating a depth for pixels according to the disclosure discussed below in relation with FIG. 4.

Figure 2A:
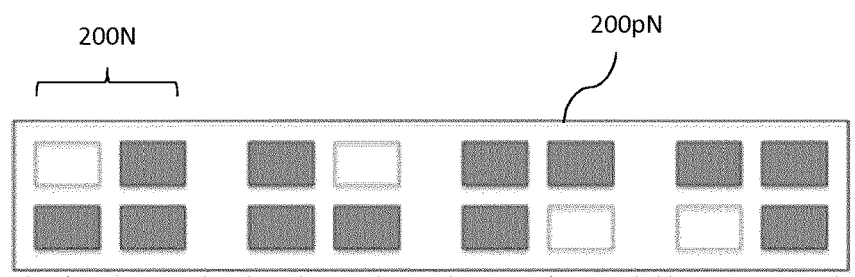

We now describe in relationship with FIG. 2a a plurality 200pN of sets of images 200N according to one embodiment.

Each set of images 200N (also named "angular patch") of the plurality 200pN comprises three different images (depicted in dark grey) taken among the four images of the matrix of images 100mi.

Such set of images 200N and such plurality 200pN of sets of images 200N are used in the method for estimating a depth for pixels according to the disclosure as discussed below in relation with FIG. 4.

Figure 2B:
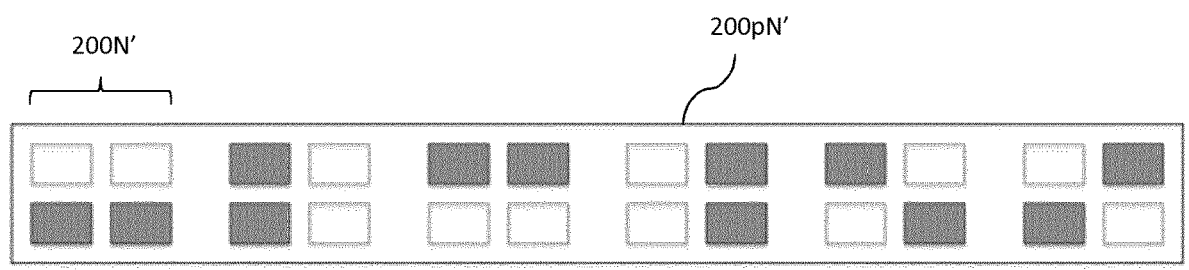

In the present embodiment, the plurality 200pN comprises four sets of images 200N. In other embodiments, the method for estimating a depth for pixels according to the disclosure relies on sets of images comprising a different number of images than three and the plurality of sets of images comprises a different number of sets of images than four. For instance, in the embodiment illustrated in FIG. 2b, each set of images 200N' of the plurality 200pN' comprises two different images (still depicted in dark grey) taken among the four images of the matrix of images 100mi. The plurality 200pN' comprises six sets of images 200N'.

Figure 3A:
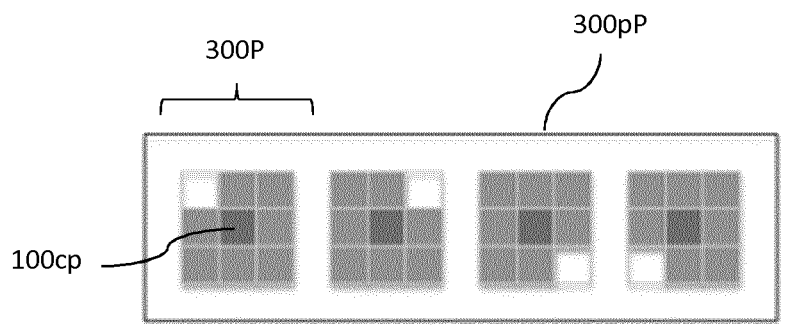

We now describe in relationship with FIG. 3a a plurality 300pP of spatial patches of pixels 300P according to one embodiment.

Each spatial patch of pixels 300P of the plurality 300pP comprises eight different pixels taken in a neighborhood of the current pixel 100cp in the current image 100ci. Spatial neighborhoods usually consist in a square spatial patch of an odd side length, centered on the considered current pixel 100cp.

Such set of spatial patches of pixels 300P and such plurality 300pP of spatial patches of pixels 300P are used in some embodiments of the method for estimating a depth for pixels according to the disclosure as discussed below in relation with FIG. 4.

Figure 3B:
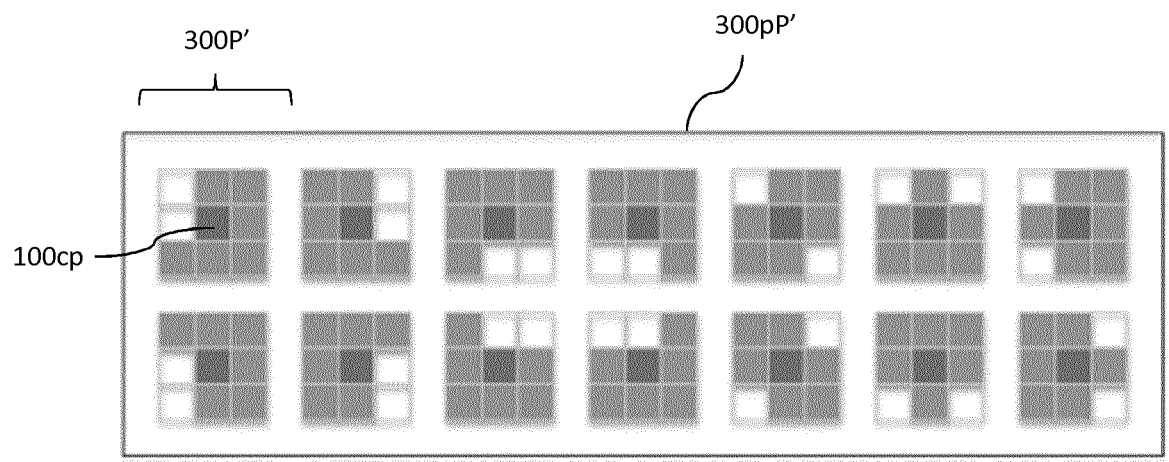

In the present embodiment, the plurality 300pP comprises four spatial patches of pixels 300P. In other embodiments, the method for estimating a depth for pixels according to the disclosure uses spatial patches of pixels comprising a different number of pixels than eight and the plurality of spatial patches of pixels comprises a different number of spatial patches of pixels than four. For instance, in the embodiment illustrated in FIG. 3b, each spatial patches of pixels 300P' of the plurality 300pP' comprises seven different pixels taken in a neighborhood of the current pixel 100cp in the current image 100ci. The plurality 300pP' comprises fourteen spatial patches of pixels 300P'.

Figure 4:
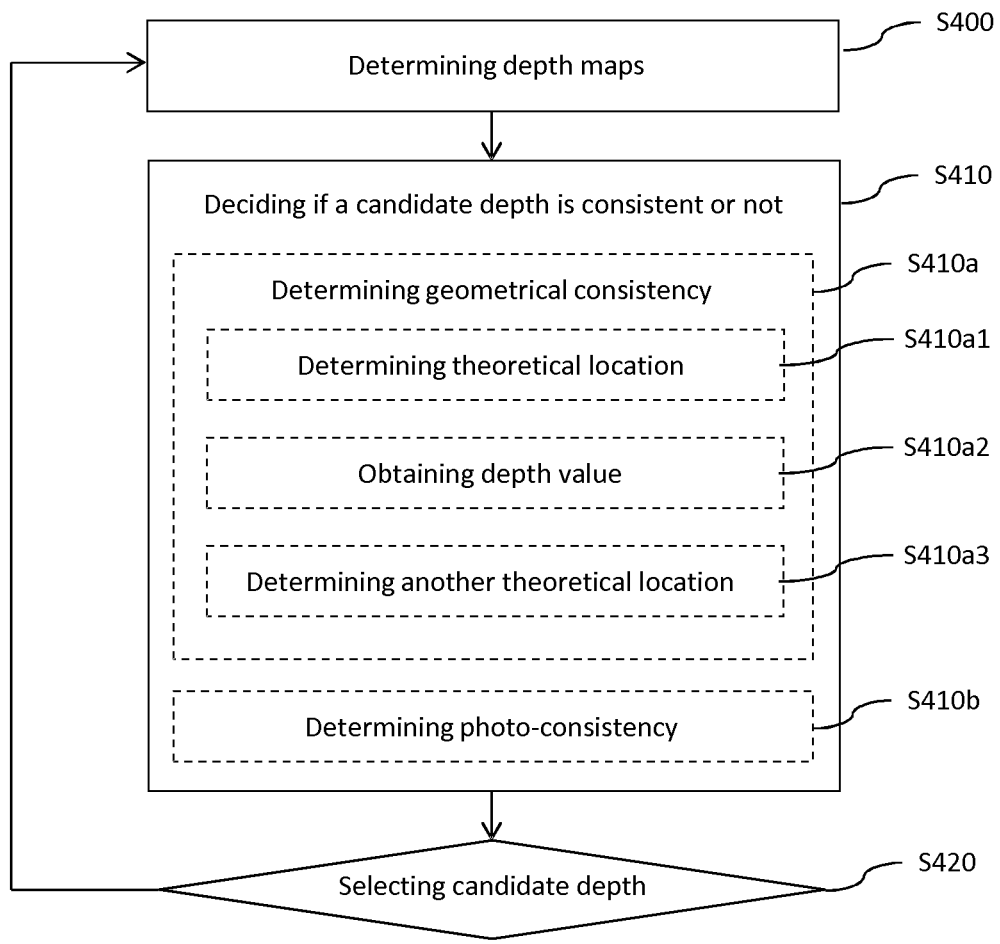
FIG. 4 illustrates a flowchart of a method for estimating a depth for pixels in the matrix of images of FIG. 1 according to one embodiment.

We now describe in relationship with FIG. 4 the steps of a method for estimating a depth for pixels in the matrix of images 100mi according to one embodiment.

The method for estimating a depth for pixels in the matrix of images 100mi comprises, at least for a set of N images taken among the M images of the matrix of images 100mi (in the embodiment of FIG. 1, M=4. However, as discussed above any value of M greater than 2 can be considered for applying the present method) and comprising the current image 100ci, with 2<N≤M, a process comprising the following steps:

in a step S400, depth maps are determined for the images in the set of N images delivering a set of N depth maps; and for at least the current pixel 100cp in the current image 100ci for which a depth has not yet been estimated:

in a step S410, it is decided if a candidate depth corresponding to a depth value associated with the current pixel 100cp in a depth map of the set of N depth maps is consistent or not with the other depth map(s) of the set of N depth maps; and in a step S420, the candidate depth is selected as being the estimated depth for the current pixel 100cp, if the candidate depth is decided as consistent with the other depth map(s) of the set of N depth maps.

The process is enforced iteratively, each new iteration of the process being carried out with a new N value which is lower than the previous N value used in the previous iteration of the process.

Thus, the estimation of the depth of the current pixel 100cp is based on an iterative process involving a different set of images for each iteration. Consequently, all the information available in the matrix of images 100mi is used so that a reliable depth estimation is achieved even in presence of occlusions. Furthermore, sets of images comprising a decreasing number of images are successively considered for the iterations of the process. Thus, the first time a depth is decided as consistent corresponds to a depth estimated based on a greatest number of images in the LF content. This allows a higher quality in the result.

In other embodiments, the step S410 and the step S420 are enforced not only for the current pixel 100cp in the current image 100ci, but for each pixel of each image of the set of N images for which a depth has not yet been estimated.

In other embodiments wherein N<M, and wherein the set of N images belongs to a plurality of sets of N images taken among the M images of the current image 100ci, each iteration of the process is carried out for each set of N images of the plurality of sets of N images. Thus, all the available information in the different views is used, leading to improved depth estimations. In some embodiments, the plurality of sets of N images comprises all the sets of N images taken among the M images of the current image 100ci.

Back to FIG. 4, for deciding if a candidate depth of the current pixel 100cp is consistent or not with the other depth map(s), the step S410 comprises a step S410a in which a geometrical consistency between the candidate depth of the current pixel 100cp and the other depth map(s) of the set of N depth maps is determined. A geometrical consistency criterion between the views allows deciding a depth value that corresponds to a consistent reconstructed 3D scene for all the considered view.

Figure 5:
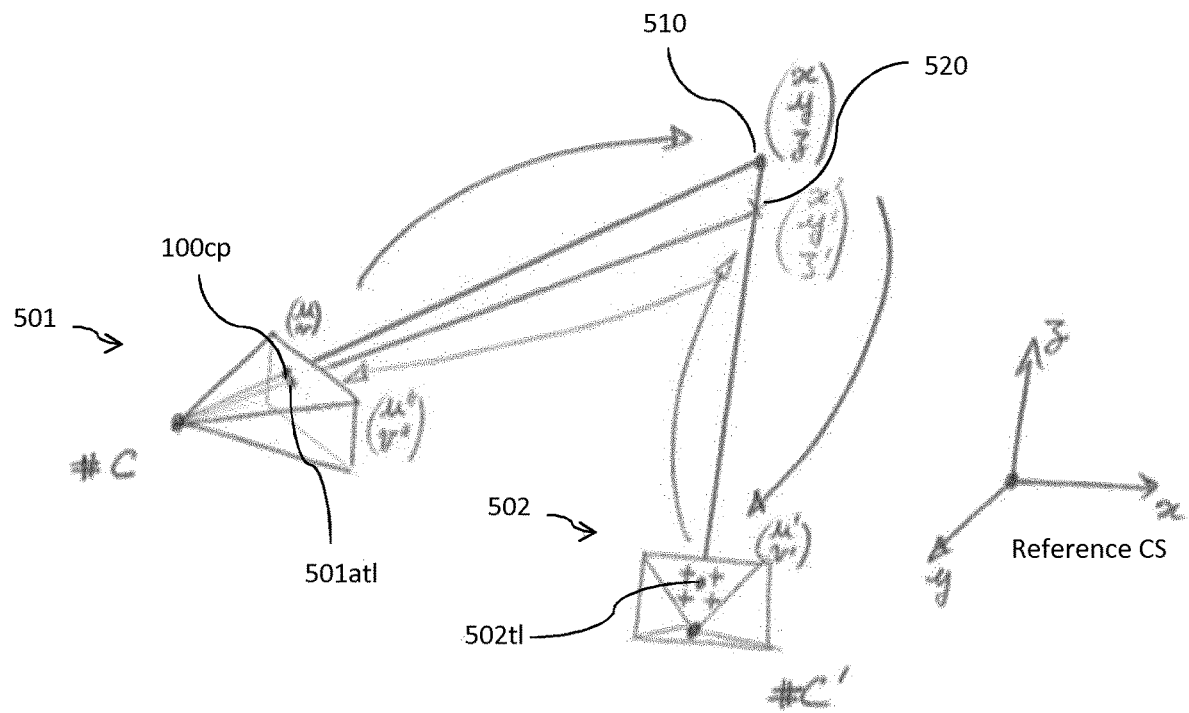
FIG. 5 illustrates a change from one view to another view corresponding to different images in the matrix of images of FIG. 1 according to one embodiment.

The derivation of such geometrical consistency is illustrated through an example depicted in FIG. 5.

Only two cameras 501, 502 among the four of the LF capturing system capturing the matrix of images 100mi are illustrated in FIG. 5. More particularly, camera 501 captures the current image 100ci, that corresponds to view number #c, and camera 502 captures another image than current image 100ci in the matrix of images 100mi. The considered other image corresponds to view number #c'.

Let $$\begin{pmatrix} u \\ v \end{pmatrix} \in \mathbb{N}^2$$

be the coordinates of the current pixel 100cp in view #c. Let $$\begin{pmatrix} x \\ y \\ z \end{pmatrix}$$

be the coordinates of the corresponding 3D point 510 in the reference coordinate system (CS), according to the candidate depth associated to the current pixel 100cp. Its projection in the other image corresponding to view number #c' gives the theoretical location 502tl of coordinates $$\begin{pmatrix} u' \\ v' \end{pmatrix} \in \mathbb{R}^2.$$

Indeed, such projection, based e.g. on a pinhole model of the cameras 501, 502, leads to a location that may not coincide exactly with a pixel of the considered another image. Interpolating the depth map of the other image corresponding to view number #c', one can compute the corresponding 3D point 520 of coordinates $$\begin{pmatrix} x' \\ y' \\ z' \end{pmatrix}$$

and project it back in view number #c, ending at another theoretical location 501atl coordinates $$\begin{pmatrix} u'' \\ v'' \end{pmatrix} \in \mathbb{R}^2$$

in the current image 100ci.

The candidate depth of the current pixel 100cp is decided as consistent when a norm of the drift vector $$\begin{pmatrix} \Delta u \\ \Delta v \end{pmatrix} = \begin{pmatrix} u'' - u \\ v'' - v \end{pmatrix}$$

is lower man a predetermined threshold, e.g.:

$$\left\| \begin{matrix} \Delta u \\ \Delta v \end{matrix} \right\|_\infty = \max\{u'' - u, v'' - v\} \le 0.5$$

In other words, in the embodiment of FIG. 4, the step S410a comprises:

a step S410a1 in which the theoretical location 502t1 in the other image of the set of N images than the current image 100ci is determined. The theoretical location corresponds to a projection in the other image of the object point 510 associated to the current pixel 100cp and to the candidate depth;

a step S410a2 in which a depth value associated to the theoretical location 502t1 based on a depth map associated to the other image in the set of N depth maps is obtained; and a step S410a3 in which, in the current image 100ci, another theoretical location 501atl corresponding to a projection in the current image 100ci of the other object point 520 associated to the theoretical location 502t1 and to the depth value is determined.

The candidate depth of the current pixel 100cp is decided as consistent when a distance in the current image between the current pixel 100cp and the other theoretical location 501atl is below a predetermined threshold (e.g. the predetermined threshold is half a size of a pixel in the current image).

In other embodiments wherein N>3, the step S410a1 is enforced for all the other images of the set of N images than the current image 100ci, delivering a corresponding set of theoretical locations. The step S410a2 is enforced for all the theoretical locations in the set of theoretical locations delivering a corresponding set of depth values. The step S410a3 is enforced for all the theoretical locations in the set of theoretical locations and for all the associated depth values in the set of depth values, delivering a set of another theoretical locations in the current images 100ci. The candidate depth of the current pixel 100cp is decided as consistent when a distance between the current pixel 100cp and the other theoretical locations is below the predetermined threshold. Thus, the consistency is based on the information present in all the images of the matrix of images.

Back to FIG. 4, the step S410 also comprises a step S410b in which a photo-consistency between the current pixel 100cp and the theoretical location(s) 502t1 is determined.

For instance, the photometric consistency can be measured by the standard deviation of the color distribution within the other image(s) at the theoretical location(s) 502tl:

$$P\left(\left\{c, \begin{pmatrix} u \\ v \end{pmatrix}, z_c\right\}\right) = \sqrt{\frac{1}{P} \sum_{c'} \|I_{c'}(u', v')\|^2 - \frac{1}{P^2} \left\|\sum_{c'} I_{c'}(u', v')\right\|^2}$$

with $z_c$ the candidate depth associated to the current pixel 100cp of coordinates $$\begin{pmatrix} u \\ v \end{pmatrix}$$

in the current image 100ci corresponding to view number #c.

Geometrical consistency determined in step S410a and photo-consistency determined in step S410b are combined for deciding if the candidate depth associated with the current pixel 100cp is consistent or not with the other depth map(s) of the set of N depth maps. For instance, such combination relies on the method proposed in K. Wolff et al., "*Point Cloud Noise and Outlier Removal for Image-Based 3D Reconstruction*," 2016 Fourth International Conference on 3D Vision (3DV), Stanford, Calif., 2016, pp. 118-127.

In other embodiments, only a geometrical consistency criterion is used for deciding if the candidate depth of the current pixel 100cp is consistent or not with the other depth map(s) in step S410.

In other embodiments, only a photo-consistency criterion is used for deciding if the candidate depth of the current pixel 100cp is consistent or not with the other depth map(s).

In still other embodiments, any other consistency criterion between the images of the matrix of images 100mi is used for deciding if a candidate depth of the current pixel 100cp is consistent or not with the other depth map(s).

Back to FIG. 4, for determining the depth maps for the images in the set of N images, the step S400 enforces, for at least the current pixel 100cp, a matching technic between:
- a spatial patch of P pixels of the current image 100ci, P≤Pmax with Pmax the total number of pixels in the current image 100ci, taken in a neighborhood of the current pixel 100cp; and
- at least a projection of the spatial patch of P pixels in at least another image than the current image 100ci in the set of N images, delivering the candidate depth associated to the current pixel 100cp in a depth map associated to the current image 100ci. The step S400 is enforced iteratively, each new iteration of the step S400 being carried out with a new value of P which is lower than the previous value of P used in the previous iteration of the step S400.

Thus, the determination of depth maps is based on the use of all the information available in the images of the LF content. Furthermore, spatial patches of pixels of decreasing number of pixels are successively considered for the successive iterations. Thus, the first time a depth value in a depth map is determined corresponds to a depth value determined based on a largest number of pixels in the images of the LF content. This allows a higher quality in the result In one embodiment, the projection of the spatial patch of P pixels in at least another image than the current image 100ci is obtained for instance using the same projection mechanism, based e.g. on a pinhole model of the cameras of the LF capturing system, as disclosed above in relation with FIG. 5.

In some embodiments wherein P<Pmax, the spatial patch of P pixels belongs to a plurality of spatial patches of P pixels. For a given iteration of the step S400, the matching technic is successively enforced for each spatial patch of P pixels belonging to the plurality of spatial patches of P pixels, delivering a set of intermediate depth values and a corresponding set of confidence values associated to the current pixel 100cp. The candidate depth associated to the current pixel 100cp in the depth map associated to the current image 100ci is an intermediate depth value of higher confidence value in the set of intermediate depth values. In variants, the plurality of spatial patches of P pixels comprises all the spatial patches of P pixels.

Thus, for a given size of patches of pixels considered for determining the depth maps, the patch of pixels that provides the best confidence level is kept for determining the depth maps in question.

In some embodiments, the matching technic enforces a minimization of a cost function $E_c$ according to:

$$D_c[u,v] = \operatorname*{argmin}_{z}\{E_c(u,v,z)\}_z$$

with $D_c$ the depth map for the current image 100ci corresponding to view #c and (u, v) the coordinates of the current pixel 100cp in the current image 100ci.

In that case, the successive enforcement of the matching technic further delivers a set of minimum values of the cost function $E_c$. In some embodiments, the confidence value is a function at least of:
- a minimum value $m_1$ in the set of minimum values, e.g. the confidence value is equal to $-m_1$; or
- a combination of the minimum value $m_1$ and of an antepenultimate minimum value $m_3$ in the set of minimum values, e.g. the confidence value is equal to $$\frac{m_3 - m_1}{m_3}.$$

In some embodiments, the cost function $E_c$ is a function of an MSE (for "Mean Squared Error") norm, e.g.:

$$E_c(u,v,z) = \frac{1}{|\Omega_a - 1| \cdot |\Omega_s(u,v)|} \sum_{\substack{c' \in \Omega_a \\ c' \neq c}} \sum_{(i,j) \in \Omega_s(u,v)} \|I_{c'}(i',j') - I_c(i,j)\|_2^2$$

with:
- $\Omega_a$ the considered set of N images (or "angular patch") that contains view #c;
- $\Omega_s(u,v)$ the considered spatial patch of P pixels taken in a neighborhood of the current pixel 100cp of coordinate (u, v);
- $|\Omega|$ the cardinal of the set $\Omega$; and
- $\|\cdot\|_2$ the L2 norm (square-root of the sum of squared components); and with (i',j',z') obtained from (i,j,z) through the homography $H_{cc'}: \mathbb{R}^3 \to \mathbb{R}^3$ between views #c and #c' (for example using the same projection mechanism, based e.g. on a pinhole model of the cameras of the LF capturing system, as disclosed above in relation with FIG. 5).

In some embodiments, the cost function $E_c$ is a function of an MAD (for "Mean Absolute Difference") norm, e.g.:

$$E_c(u,v,z) = \frac{1}{|\Omega_a - 1| \cdot |\Omega_s(u,v)|} \sum_{\substack{c' \in \Omega_a \\ c' \neq c}} \sum_{(i,j) \in \Omega_s(u,v)} \|I_{c'}(i',j') - I_c(i,j)\|_1$$

with $\|\cdot\|_1$ the L1 norm (sum of absolute values).

In some embodiments, the cost function $E_c$ is a function of an ZNCC (for "Zero-mean Normalized Cross-correlation") norm, e.g.:

$$E_c(u, v, z) = -\sum_{p \in \{r,g,b\}} ZNCC_c^p(u, v, z)$$

where the summation is performed on the three components R, G and B, and with:

$$ZNCC_c(u, v, z) = \frac{1}{|\Omega_a - 1| \cdot |\Omega_s(u, v)|} \sum_{\substack{c' \in \Omega_a \\ c' \neq c}} \sum_{(i,j) \in \Omega_s(u,v)} \frac{(I_c(i, j) - \mu_{I_c}(u, v)) \cdot (I_{c'}(i', j') - \mu_{I_{c'}}(u', v'))}{\sigma_{I_c}(u, v) \cdot \sigma_{I_{c'}}(u', v')}$$

where:

$$\mu_I(u, v) = \frac{1}{|\Omega_s(u, v)|} \sum_{(i,j) \in \Omega_s(u,v)} I(i, j)$$

is the mean of image I in the spatial patch $\Omega_s(u, v)$ taken in a neighborhood of the current pixel 100cp of coordinate (u, v); and $$\sigma_I(u, v) = \sqrt{\frac{1}{|\Omega_s(u, v)|} \sum_{(i,j) \in \Omega_s(u,v)} (I(i, j) - \mu_I(u, v))^2}$$

is the standard deviation of image I in the spatial patch $\Omega_s(u, v)$ taken in a neighborhood of the current pixel 100cp of coordinate (u, v).

Figure 6:
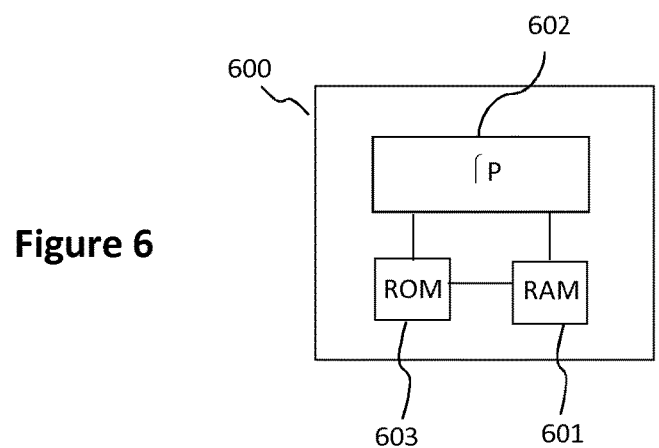
FIG. 6 illustrates an exemplary device that can be used for implementing the method of FIG. 4.

FIG. 6 illustrates the structural blocks of a particular embodiment of a device 600 that can be used for estimating a depth for pixels in a matrix of images of a light field content according to the disclosure (according to any of the embodiments disclosed above).

In this embodiment, the device 600 for implementing the disclosed method comprises a non-volatile memory 603 (e.g. a read-only memory (ROM) or a hard disk), a volatile memory 601 (e.g. a random-access memory or RAM) and a processor 602. The non-volatile memory 603 is a non-transitory computer-readable carrier medium. It stores executable program code instructions, which are executed by the processor 602 in order to enable implementation of the method described above (method for estimating a depth for pixels in a matrix of images of a light field content) in its various embodiments disclosed above in relationship with FIG. 4.

Upon initialization, the aforementioned program code instructions are transferred from the non-volatile memory 603 to the volatile memory 601 so as to be executed by the processor 602. The volatile memory 601 likewise includes registers for storing the variables and parameters required for this execution.

All the steps of the above method for estimating a depth for pixels in a matrix of images of a light field content according to the disclosure may be implemented equally well:

- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or
- by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it may also be implemented in hardware form or any form combining a hardware portion and a software portion.

According to one embodiment, a method is proposed for estimating a depth for pixels in a matrix of M images of a light field content, with M>2. Such method comprises, at least for one set of N images taken among the M images, 2<N≤M, a process comprising:

determining depth maps for the images in the set of N images delivering a set of N depth maps; and for at least one current pixel in a current image of the set of N images:

deciding if a candidate depth corresponding to a depth value associated with the current pixel in a depth map of the set of N depth maps is consistent or not with the other depth map(s) of the set of N depth maps; and selecting the candidate depth as being the estimated depth for the current pixel, if the candidate depth is decided as consistent with the other depth map(s) of the set of N depth maps.

The process is enforced iteratively, each new iteration of the process being carried out with a new N value which is lower than the previous N value used in the previous iteration of the process.

Thus, the present disclosure proposes a new and inventive solution for estimating the depth of pixels in a light filed (LF) content with an enforced consistency.

More particularly, the estimation of the depth of the pixels is based on an iterative process involving a different set of images (also named angular patch) for each iteration. Thus, all the information available in the matrix of images of the LF content is used so that a reliable depth estimation is achieved even in presence of occlusions.

Furthermore, sets of images comprising a decreasing number of images are successively considered for the iterations of the process. Thus, the first time a depth is decided as consistent corresponds to a depth estimated based on a greatest number of images in the LF content. This allows a higher quality in the result.

According to one embodiment, a device is proposed for estimating a depth for pixels in a matrix of M images of a light field content, with M>2. Such device comprises a processor or a dedicated computing machine configured for, at least for one set of N images taken among the M images, 2<N≤M, enforcing a process comprising:

determining depth maps for the images in the set of N images delivering a set of N depth maps; and for at least one current pixel in a current image of the set of N images:

deciding if a candidate depth corresponding to a depth value associated with the current pixel in a depth map of the set of N depth maps is consistent or not with the other depth map(s) of the set of N depth maps; and selecting the candidate depth as being the estimated depth for the current pixel, if the candidate depth is decided as consistent with the other depth map(s) of the set of N depth maps.

The process is enforced iteratively, each new iteration of the process being carried out with a new N value which is lower than the previous N value used in the previous iteration of the process.

According to one embodiment, the deciding if a candidate depth of the current pixel is consistent or not, and the selecting the depth of the current pixel are enforced for each pixel of each image of the set of N images for which a depth has not yet been estimated.

According to one embodiment, N<M and the set of N images belongs to a plurality of sets of N images taken among the M images. Each iteration of the process is carried out for each set of N images.

According to one embodiment, the plurality of sets of N images comprises all the sets of N images taken among the M images.

According to one embodiment, the deciding if a candidate depth of the current pixel is consistent or not comprises determining a geometrical consistency between the candidate depth of the current pixel and the other depth map(s) of the set of N depth maps.

Thus, a geometrical consistency criterion between the views allows deciding a depth value that corresponds to a consistent reconstructed 3D scene for all the considered view.

According to one embodiment, the determining a geometrical consistency comprises:
  determining a theoretical location in another image of the set of N images than the current image, the theoretical location corresponding to a projection in the other image of an object point associated to the current pixel and to the candidate depth;
  obtaining a depth value associated to the theoretical location based on a depth map associated to the other image in the set of N depth maps; and
  determining, in the current image, another theoretical location corresponding to a projection in the current image of another object point associated to the theoretical location and to the depth value;
the candidate depth of the current pixel being decided as consistent when a distance in the current image between the current pixel and the other theoretical location is below a predetermined threshold.

According to one embodiment, N>3. The determining a theoretical location in another image is enforced for all the other images of the set of N images than the current image delivering a corresponding set of theoretical locations. The obtaining a depth value associated to the theoretical location is enforced for all the theoretical locations in the set of theoretical locations delivering a corresponding set of depth values. The determining, in the current image, another theoretical location is enforced for all the theoretical locations in the set of theoretical locations and for all the associated depth values in the set of depth values, delivering a set of another theoretical locations in the current images, the candidate depth of the current pixel being decided as consistent when a distance between the current pixel and the other theoretical locations is below the predetermined threshold (e.g. the predetermined threshold is half a size of a pixel in the current image).

According to one embodiment, the deciding if a candidate depth of the current pixel is consistent or not further comprises determining a photo-consistency between the current pixel and the theoretical location(s).

According to one embodiment, the determining depth maps for the images in the set of N images enforces for at least the current pixel, a matching technic between:
  a spatial patch of P pixels of the current image, P≤Pmax with Pmax the total number of pixels in the current image, taken in a neighborhood of the current pixel; and
  at least a projection of the spatial patch of P pixels in at least another image than the current image in the set of N images,
delivering the candidate depth associated to the current pixel in a depth map associated to the current image. The determining depth maps is enforced iteratively, each new iteration of the determining depth maps being carried out with a new value of P which is lower than the previous value of P used in the previous iteration of the determining depth maps.

Thus, a determination of depth maps based on an iterative process involving for each iteration a different spatial patch of pixels thus allowing the use of all the information available in the images of the LF content.

Furthermore, spatial patches of pixels of decreasing number of pixels are successively considered for the successive iterations. Thus, the first time a depth value in a depth map is determined corresponds to a depth value determined based on a greatest number of pixels in the images of the LF content. This allows a higher quality in the result.

According to one embodiment, P<Pmax and the spatial patch of P pixels belongs to a plurality of spatial patches of P pixels. For a given iteration of the determining depth maps, the matching technic is successively enforced for each spatial patch of P pixels belonging to the plurality of spatial patches of P pixels, delivering a set of intermediate depth values and a corresponding set of confidence values associated to the current pixel, the candidate depth associated to the current pixel in the depth map associated to the current image being an intermediate depth value of higher confidence value in the set of intermediate depth values.

Thus, for a given size of patches of pixels considered for determining the depth maps, the patch of pixels that provides the best confidence level is kept for determining the depth maps in question.

According to one embodiment, the plurality of spatial patches of P pixels comprises all the spatial patches of P pixels.

According to one embodiment, the matching technic enforces a minimization of a cost function. The successive enforcement of the matching technic further delivers a set of minimum values of the cost function, the confidence value being a function at least of:
  a minimum value in the set of minimum values; or
  a combination of the minimum value and of at least an antepenultimate minimum value in the set of minimum values.

According to one embodiment, the cost function is a function of a norm belonging to the group comprising:
  Mean Squared Error;
  Mean Absolute Difference; or
  Zero-mean Normalized Cross-correlation.

According to one embodiment, a non-transitory computer readable medium comprising a computer program product recorded thereon and capable of being run by a processor, including program code instructions comprising program code instructions for implementing a method for estimating a depth for pixels in a matrix of M images of a light field content previously described is proposed

The invention claimed is:

1. A method for estimating a depth for pixels in a matrix of M images of a light field content, with M>2, comprising, at least for one set of N images taken among said M images, 2<N≤M, a process comprising:
    determining depth maps for the images in said set of N images delivering a set of N depth maps; and
    for at least one current pixel in a current image of said set of N images:
        deciding if a candidate depth corresponding to a depth value associated with said current pixel in a depth map of said set of N depth maps is consistent or not with the other depth map(s) of said set of N depth maps; and
        selecting said candidate depth as being the estimated depth for said current pixel, if said candidate depth is decided as consistent with the other depth map(s) of said set of N depth maps.

2. The method according to claim 1,
    wherein N<M and said set of N images belongs to a plurality of sets of N images taken among said M images,
    and wherein each iteration of said process is carried out for each set of N images.

3. The method according to claim 1, wherein said deciding if a candidate depth of said current pixel is consistent or not comprises determining a geometrical consistency between said candidate depth of said current pixel and said other depth map(s) of said set of N depth maps.

4. The method according to claim 3,
    wherein said determining a geometrical consistency comprises:
        determining a theoretical location in another image of said set of N images than said current image, said theoretical location corresponding to a projection in said other image of an object point associated to said current pixel and to said candidate depth;
        obtaining a depth value associated to said theoretical location based on a depth map associated to said other image in said set of N depth maps; and
        determining, in said current image, another theoretical location corresponding to a projection in said current image of another object point associated to said theoretical location and to said depth value;
    said candidate depth of said current pixel being decided as consistent when a distance in said current image between said current pixel and said other theoretical location is below a predetermined threshold.

5. The method according to claim 4,
    wherein N>3,
    wherein said determining a theoretical location in another image is enforced for all the other images of said set of N images than said current image delivering a corresponding set of theoretical locations,
    wherein said obtaining a depth value associated to said theoretical location is enforced for all the theoretical locations in said set of theoretical locations delivering a corresponding set of depth values,
    and wherein said determining, in said current image, another theoretical location is enforced for all the theoretical locations in said set of theoretical locations and for all the associated depth values in said set of depth values, delivering a set of other theoretical locations in said current images,
    said candidate depth of said current pixel being decided as consistent when a distance between said current pixel and said other theoretical locations is below said predetermined threshold.

6. The method according to claim 4, wherein said deciding if a candidate depth of said current pixel is consistent or not further comprises determining a photo-consistency between said current pixel and said theoretical location(s).

7. The method according to claim 1, wherein said determining depth maps for the images in said set of N images enforces for at least said current pixel, a matching technic between:
    a spatial patch of P pixels of said current image, P≤Pmax with Pmax the total number of pixels in the current image, taken in a neighborhood of said current pixel; and
    at least a projection of said spatial patch of P pixels in at least another image than said current image in said set of N images,
    delivering said candidate depth associated to said current pixel in a depth map associated to said current image,
    wherein, said determining depth maps is enforced iteratively, each new iteration of said determining depth maps being carried out with a new value of P which is lower than the previous value of P used in the previous iteration of said determining depth maps.

8. The method according to claim 7,
    wherein P<Pmax and said spatial patch of P pixels belongs to a plurality of spatial patches of P pixels,
    and wherein for a given iteration of said determining depth maps, said matching technic is successively enforced for each spatial patch of P pixels belonging to said plurality of spatial patches of P pixels, delivering a set of intermediate depth values and a corresponding set of confidence values associated to said current pixel,
    said candidate depth associated to said current pixel in said depth map associated to said current image being an intermediate depth value of higher confidence value in said set of intermediate depth values.

9. The method according to claim 8, wherein said matching technic enforces a minimization of a cost function, and wherein said successive enforcement of said matching technic further delivers a set of minimum values of said cost function, said confidence value being a function at least of:
    a minimum value in said set of minimum values; or
    a combination of said minimum value and of at least an antepenultimate minimum value in said set of minimum values.

10. The method according to claim 1, wherein said process is enforced iteratively, each new iteration of said process being carried out with a new N value which is lower than the previous N value used in the previous iteration of said process.

11. A non-transitory computer-readable carrier medium storing program code instructions that, when said program code instructions are executed by a processor, perform the method according to claim 1.

12. A device for estimating a depth for pixels in a matrix of M images of a light field content, with M>2, comprising a processor or a dedicated computing machine configured for, at least for one set of N images taken among said M images, 2<N≤M, enforcing a process comprising:
    determining depth maps for the images in said set of N images delivering a set of N depth maps; and
    for at least one current pixel in a current image of said set of N images:

deciding if a candidate depth corresponding to a depth value associated with said current pixel in a depth map of said set of N depth maps is consistent or not with the other depth map(s) of said set of N depth maps; and selecting said candidate depth as being the estimated depth for said current pixel, if said candidate depth is decided as consistent with the other depth map(s) of said set of N depth maps.

13. The device according to claim 12, wherein said process is enforced iteratively, each new iteration of said process being carried out with a new N value which is lower than the previous N value used in the previous iteration of said process.

14. The device according to claim 12,
wherein N<M and said set of N images belongs to a plurality of sets of N images taken among said M images,
and wherein each iteration of said process is carried out for each set of N images.

15. The device according to claim 12, wherein said deciding if a candidate depth of said current pixel is consistent or not comprises determining a geometrical consistency between said candidate depth of said current pixel and said other depth map(s) of said set of N depth maps.

16. The device according to claim 15, wherein said determining a geometrical consistency comprises:
determining a theoretical location in another image of said set of N images than said current image, said theoretical location corresponding to a projection in said other image of an object point associated to said current pixel and to said candidate depth;
obtaining a depth value associated to said theoretical location based on a depth map associated to said other image in said set of N depth maps; and
determining, in said current image, another theoretical location corresponding to a projection in said current image of another object point associated to said theoretical location and to said depth value;
said candidate depth of said current pixel being decided as consistent when a distance in said current image between said current pixel and said other theoretical location is below a predetermined threshold.

17. The device according to claim 16,
wherein N>3,
wherein said determining a theoretical location in another image is enforced for all the other images of said set of N images than said current image delivering a corresponding set of theoretical locations,
wherein said obtaining a depth value associated to said theoretical location is enforced for all the theoretical locations in said set of theoretical locations delivering a corresponding set of depth values,
and wherein said determining, in said current image, another theoretical location is enforced for all the theoretical locations in said set of theoretical locations and for all the associated depth values in said set of depth values, delivering a set of other theoretical locations in said current images,
said candidate depth of said current pixel being decided as consistent when a distance between said current pixel and said other theoretical locations is below said predetermined threshold.

18. The device according to claim 16, wherein said deciding if a candidate depth of said current pixel is consistent or not further comprises determining a photo-consistency between said current pixel and said theoretical location(s).

19. The device according to claim 12, wherein said determining depth maps for the images in said set of N images enforces for at least said current pixel, a matching technic between:
a spatial patch of P pixels of said current image, P≤Pmax with Pmax the total number of pixels in the current image, taken in a neighborhood of said current pixel; and
at least a projection of said spatial patch of P pixels in at least another image than said current image in said set of N images,
delivering said candidate depth associated to said current pixel in a depth map associated to said current image,
wherein, said determining depth maps is enforced iteratively, each new iteration of said determining depth maps being carried out with a new value of P which is lower than the previous value of P used in the previous iteration of said determining depth maps.

20. The device according to claim 19,
wherein P<Pmax and said spatial patch of P pixels belongs to a plurality of spatial patches of P pixels,
and wherein for a given iteration of said determining depth maps, said matching technic is successively enforced for each spatial patch of P pixels belonging to said plurality of spatial patches of P pixels, delivering a set of intermediate depth values and a corresponding set of confidence values associated to said current pixel,
said candidate depth associated to said current pixel in said depth map associated to said current image being an intermediate depth value of higher confidence value in said set of intermediate depth values.

* * * * *